United States Patent
Zuo

(10) Patent No.: US 10,757,072 B2
(45) Date of Patent: Aug. 25, 2020

(54) PACKET TRANSMISSION METHOD, APPARATUS, AND SYSTEM

(71) Applicant: Huawei Technologies Co., Ltd., Shenzhen (CN)

(72) Inventor: Shaofu Zuo, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/021,770

(22) Filed: Jun. 28, 2018

(65) Prior Publication Data

US 2018/0309718 A1  Oct. 25, 2018

Related U.S. Application Data

(63) Continuation of application No. PCT/CN2015/099964, filed on Dec. 30, 2015.

(51) Int. Cl.
*H04L 29/12* (2006.01)
*G06F 9/455* (2018.01)
*H04L 12/46* (2006.01)

(52) U.S. Cl.
CPC ...... *H04L 61/2592* (2013.01); *G06F 9/45558* (2013.01); *H04L 12/4633* (2013.01); *H04L 12/4641* (2013.01); *H04L 61/103* (2013.01); *H04L 61/2521* (2013.01); *H04L 61/3025* (2013.01); *G06F 2009/45595* (2013.01); *H04L 61/2514* (2013.01)

(58) Field of Classification Search
CPC . H04L 12/4641; H04L 49/70; H04L 61/6022; H04L 45/66; H04L 45/586; H04L 61/2007; H04Q 2213/13531; Y10S 379/901
See application file for complete search history.

(56) References Cited

U.S. PATENT DOCUMENTS

| | | | |
|---|---|---|---|
| 8,958,293 B1* | 2/2015 | Anderson | H04L 67/1002 370/230 |
| 9,276,897 B2* | 3/2016 | Zhang | H04L 47/12 |
| 9,634,930 B2* | 4/2017 | Shimokuni | H04L 45/586 |
| 2007/0053328 A1* | 3/2007 | Riittinen | H04L 63/0272 370/338 |
| 2013/0148541 A1 | 6/2013 | Zhang et al. | |
| 2014/0310362 A1 | 10/2014 | Babu et al. | |

(Continued)

FOREIGN PATENT DOCUMENTS

| CN | 103716245 A | 4/2014 |
|---|---|---|
| CN | 104038422 A | 9/2014 |

(Continued)

*Primary Examiner* — Ayaz R Sheikh
*Assistant Examiner* — Debebe A Asefa
(74) *Attorney, Agent, or Firm* — Slater Matsil, LLP

(57) ABSTRACT

This application provides a packet transmission method, an apparatus, and a system in an overlay network. Network address translation and reverse network address translation are implemented at a demarcation point: an IP tunnel end point, between the logical network and the physical network, an IP option is expanded to carry a source-end network element identifier and a destination-end network element identifier, and a virtual machine in an upper-layer logical network is interconnected with a peer-end virtual machine through a lower-layer physical network by using an IP tunnel.

19 Claims, 8 Drawing Sheets

(56) References Cited

U.S. PATENT DOCUMENTS

| | | |
|---|---|---|
| 2015/0043379 A1 | 2/2015 | Shimokuni et al. |
| 2015/0188729 A1 | 7/2015 | Iwata |
| 2015/0236952 A1 | 8/2015 | Liang et al. |

FOREIGN PATENT DOCUMENTS

| | | |
|---|---|---|
| CN | 104065555 A | 9/2014 |
| CN | 104935516 A | 9/2015 |

* cited by examiner

| Type | | Length | Description |
|---|---|---|---|
| Decimal | Binary | Byte | |
| 149 | 1-00-10101 | Variable | Source-end network element identifier |
| 150 | 1-00-10110 | Variable | Destination-end network element identifier |

FIG. 5

PACKET TRANSMISSION METHOD, APPARATUS, AND SYSTEM

CROSS-REFERENCE TO RELATED APPLICATIONS

This application is a continuation of International Patent Application No. PCT/CN2015/099964 filed on Dec. 30, 2015, the disclosure of which is hereby incorporated by reference in its entirety.

TECHNICAL FIELD

The present disclosure relates to the communications field, and in particular, to a packet transmission method, an apparatus, and a system.

BACKGROUND

A next-generation data center is a software-defined data center. To meet requirements of service expansion and virtual-machine online migration, the next-generation data center needs to support a layer 2 network as large as possible. A Virtual Extensible Local Area Network (VX-LAN) technology is a typical technology of an overlay network. In the VXLAN, an original Ethernet frame is encapsulated in a User Data Protocol (UDP) packet. A layer 2 network may be expanded within a layer 3 range using the VXLAN technology, so that a virtual machine can be migrated in an interconnected layer 3 network range without changing an IP address and a Media Access Control (MAC) address, thereby ensuring service continuity and providing sufficient virtual network partition resources for a large-scale and multi-tenant cloud environment. However, encapsulating a raw packet using the VXLAN technology causes packet encapsulation overheads, and leads to excessive network bandwidth consumption in a subsequent data packet transmission process. Moreover, in some networks, UDP transmission is unavailable, and consequently, the VXLAN technology cannot be used in these networks.

SUMMARY

An objective of the present disclosure is to provide a packet transmission method, an apparatus, and a system, to resolve problems of excessive encapsulation overheads, excessive network bandwidth consumption, and inapplicability of a VXLAN technology to some networks that are caused when the VXLAN technology is used.

According to one aspect, an embodiment of the present disclosure provides a packet transmission method. A first IP tunnel end point receives a raw packet sent by a first virtual machine to a second virtual machine, and modifies a source IP address and a destination IP address that are carried in the raw packet. The source IP address of the raw packet is replaced with an IP address of the first IP tunnel end point, and the destination IP address of the raw packet is replaced with an IP address of a second IP tunnel end point connected to the second virtual machine. Further, the first IP tunnel end point adds a network element identifier of the first virtual machine and a network element identifier of the second virtual machine to an IP option of the raw packet to generate a modified packet through the foregoing modification of and addition to the raw packet, and sends the modified packet to the second IP tunnel end point over a network. The modified packet is routed, over the network, to the second tunnel end point on which the second virtual machine is located. The second IP tunnel end point receives the modified packet, replaces a source IP address of the modified packet with an IP address of the first virtual machine and replaces a source MAC address of the modified packet with a MAC address of the first virtual machine based on the network element identifier of the first virtual machine that is carried in the IP option, and replaces a destination IP address of the modified packet with an IP address of the second virtual machine and replaces a destination MAC address of the modified packet with a MAC address of the second virtual machine based on the network element identifier of the second virtual machine that is carried in the IP option. A source address and a destination address of the received modified packet are modified to a source address and a destination address of the raw packet through the foregoing processing, and the second IP tunnel end point sends the processed modified packet to the second virtual machine.

According to the foregoing procedure, a packet sent by the first virtual machine is transferred to the second virtual machine, so that a packet transmission process is completed. In the foregoing packet transmission procedure, the first IP tunnel end point on a packet source end does not perform nested encapsulation on the raw packet but modifies the IP option of the raw packet, and adds the network element identifier of the first virtual machine and the network element identifier of the second virtual machine to the IP option. After receiving the modified packet transmitted over an IP network, the second IP tunnel end point on a packet destination end modifies source address information and destination address information of the modified packet based on a network element identifier of a source virtual machine and a network element identifier of a destination virtual machine that are carried in the IP option, to transfer the packet to the second virtual machine. A solution of performing nested encapsulation on a packet in the prior art is replaced with adding a source-end identifier and a destination-end identifier to the IP option of the packet, so that bandwidth consumed by network transmission is reduced, a packet structure is simple, network visibility is desirable, and data forwarding performance is high. It should be noted that the second IP tunnel end point completely recovers an IP address and a MAC address of the source virtual machine and an IP address and a MAC address of the destination virtual machine, thereby preventing the second virtual machine from discarding the modified packet.

In a possible implementation, the first IP tunnel end point and the first virtual machine are deployed on a first server, and the first IP tunnel end point is a virtual switch or a physical network interface card on the first server. The physical network interface card is an intelligent network interface card, implements packet parsing and packet modification functions, and can modify a source address and a destination address of a packet and add a network element identifier to an IP option of the packet.

An IP address and a MAC address of an IP tunnel end point are an IP address and a MAC address of a port connecting a server on which the IP tunnel end point is located to an external network. The IP address and a MAC address of the first IP tunnel end point are an IP address and a MAC address of an interface connecting a source server to a source physical switch. The IP address and a MAC address of the second IP tunnel end point are an IP and a MAC of an interface connecting a destination server to a destination physical switch. The source physical switch is a switch directly connected to the source server, and the destination physical switch is a switch directly connected to the destination server.

In a possible implementation, similar to the first IP tunnel end point, the second IP tunnel end point and the second virtual machine are deployed on a second server, and the second IP tunnel end point is a virtual switch or a physical network interface card on the second server. The physical network interface card is an intelligent network interface card, implements packet parsing and packet modification functions, and can modify a source address and a destination address of a packet and add a network element identifier to an IP option of the packet.

In a possible implementation, after recovering the source address and the destination address that are carried in the modified packet to the source address and the destination address of the raw packet, the second IP tunnel end point deletes the network element identifier of the first virtual machine and the network element identifier of the second virtual machine that are carried in the IP option.

In a possible implementation, a network element identifier of a virtual machine that is added to the IP option may be flexibly configured, provided that the network element identifier can uniquely identify the virtual machine, and an IP address and a MAC address of the virtual machine can be recovered using the network element identifier. An IP tunnel end point stores a correspondence between address information and network element identifiers of virtual machines, and the address information of the virtual machine is recovered using the correspondence. Optionally, the network element identifier may directly use a MAC address of the virtual machine. The first IP tunnel end point and the second IP tunnel end point store a correspondence between address information and network element identifiers of virtual machines, and the address information includes an IP address and a MAC address. Before adding the network element identifier of the first virtual machine and the network element identifier of the second virtual machine to the raw packet, the first IP tunnel end point determines the network element identifier of the first virtual machine and the network element identifier of the second virtual machine based on the correspondence. Correspondingly, after receiving the modified packet, the second IP tunnel end point obtains, based on the correspondence, an IP address and a MAC address that correspond to the network element identifier of the first virtual machine that is carried in the IP option and an IP address and a MAC address that correspond to the network element identifier of the second virtual machine.

In a possible implementation, virtual machines of two communication parties may be in a same network segment or in different network segments. When a network topological relationship between the virtual machines varies, a destination MAC address may vary in the packet transmission process. When the first virtual machine and the second virtual machine are in a same network segment, the first IP tunnel end point replaces a destination MAC address of the raw packet with a MAC address of the second IP tunnel end point. Alternatively, when the first virtual machine and the second virtual machine are in different network segments, the first IP tunnel end point replaces a destination MAC address of the raw packet with a MAC address of a first gateway connected to the first server. It should be noted that an upper-layer logical network in which a virtual machine is located may be a layer 2 or layer 3 network, and a lower-layer physical network may also be a layer 2 or layer 3 network. When networks in which the virtual machines of the two communication parties are located have different structures, a packet transmission procedure may adaptively change, provided that a packet is forwarded according to an existing communication protocol. Regardless of whether the logical or physical network is a layer 2 or layer 3 network, the packet transmission method in which network element identifiers of the two communication parties are carried in the IP option and that is provided in this application is applicable, provided that the packet is parsed and modified on IP tunnel end points respectively corresponding to the two communication parties.

Further, to ensure that an IP tunnel end point on a communication peer end can correctly recover address information of the two communication parties in the raw packet, content in the IP option remains unchanged in a transmission process between the first IP tunnel end point and the second IP tunnel end point.

In a possible the implementation, the packet transmission method provided in this application is applied to an SDN architecture. An SDN controller delivers a flow table to IP tunnel end points of the two communication parties, so as to implement the packet parsing and modification functions on the IP tunnel end points. Details are as follows.

The first IP tunnel end point receives a first flow table delivered by the SDN controller. The first flow table includes a mapping table and a NAT table. The mapping table includes a correspondence between address information of the first virtual machine and the network element identifier of the first virtual machine, and a correspondence between address information of the second virtual machine and the network element identifier of the second virtual machine. The NAT table indicates a packet forwarding rule. The packet forwarding rule is: replacing a source IP address and a source MAC address of the first virtual machine that are carried in the raw packet with the IP address and a MAC address of the first IP tunnel end point, replacing the destination IP address carried in the raw packet with the IP address of the second IP tunnel end point, and when the first virtual machine and the second virtual machine are in different network segments, replacing a destination MAC address carried in the raw packet with a MAC address of a first gateway connected to the first server, or when the first virtual machine and the second virtual machine are in a same network segment, replacing a destination MAC address of the raw packet with a MAC address of the second IP tunnel end point.

The second IP tunnel end point receives a second flow table delivered by the SDN controller. The second flow table includes an RNAT table that indicates a packet forwarding rule: matching the network element identifiers of the first virtual machine and the second virtual machine that are carried in the IP option of the received modified packet, replacing the source IP address and the source MAC address of the modified packet with an IP address and a MAC address that correspond to the network element identifier of the first virtual machine, and replacing the destination IP address and the destination MAC address of the modified packet with an IP address and a MAC address that correspond to the network element identifier of the second virtual machine.

It should be noted that after receiving the flow table delivered by the SDN controller, the IP tunnel end point processes the received packet according to a rule and an action (match; action) that are defined in the flow table. A process of creating and delivering a flow table by the SDN controller complies with a procedure of a standard defined by the OpenFlow protocol, and this is not limited in this application.

According to another aspect, an embodiment of the present disclosure provides a packet transmission system, including at least two servers, a first IP tunnel end point, and a second IP tunnel end point. At least one virtual machine runs on each server. After receiving a raw packet sent by a first virtual machine (a source virtual machine on a packet transmit end), the first IP tunnel end point modifies an IP option of the raw packet, and adds a network element identifier of the first virtual machine and a network element identifier of a second virtual machine (a destination virtual machine on a packet receive end) to the IP option to generate a modified packet. After receiving the modified packet transmitted over an IP network, the second IP tunnel end point on a packet destination end modifies source address information and destination address information of the modified packet based on the network element identifier of the first virtual machine and the network element identifier of the second virtual machine that are carried in the IP option, and transfers the packet to the second virtual machine.

The first IP tunnel end point, the second IP tunnel end point, and the like perform a function in the packet transmission method according to the first aspect. The function may be implemented by using hardware, or may be implemented by hardware executing corresponding software. The hardware or software includes one or more modules corresponding to the foregoing function.

According to still another aspect, an embodiment of the present disclosure provides a server. A first virtual machine and a first IP tunnel end point are deployed on the server, and the first virtual machine sends, using the first IP tunnel end point and a second IP tunnel end point on a side of a second virtual machine, a packet to the second virtual machine. The first virtual machine and the first IP tunnel end point on the server implement a function in the foregoing method. The function may be implemented using hardware, or may be implemented by hardware executing corresponding software. The hardware or software includes one or more modules corresponding to the foregoing function.

An embodiment of the present disclosure provides another server. A second virtual machine and a second IP tunnel end point are deployed on the server, and the second virtual machine receives, using the second IP tunnel end point, a packet sent by a first IP tunnel end point on a side of a first virtual machine. The second virtual machine and the second IP tunnel end point that are on the server implement a function in the foregoing packet transmission method. The function may be implemented using hardware, or may be implemented by hardware executing corresponding software. The hardware or software includes one or more modules corresponding to the foregoing function.

In a possible design, a structure of the server includes a processor, and the processor is configured to support the server to perform the corresponding function in the foregoing method. The server may further include a memory, and the memory is configured to be coupled to the processor and stores a program instruction and data that are necessary for the server to perform the foregoing function.

According to still another aspect, an embodiment of the present disclosure provides a computer storage medium, configured to store a computer software instruction used by the foregoing server, and the computer software instruction includes a program designed for executing the foregoing aspect.

BRIEF DESCRIPTION OF THE DRAWINGS

To describe the technical solutions in the embodiments of the present disclosure or in the prior art more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

FIG. 5 is a schematic structural diagram of an IP option according to an embodiment of the present disclosure;

DETAILED DESCRIPTION OF ILLUSTRATIVE EMBODIMENTS

The technical solutions according to embodiments of the present disclosure are described in the following with reference to the accompanying drawings. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

A network architecture and a service scenario that are described in the embodiments of the present disclosure are intended to describe the technical solutions in the embodiments of the present disclosure more clearly, and do not constitute any limitation to the technical solutions provided in the embodiments of the present disclosure. Persons of ordinary skill in the art may know that with evolution of network architectures and appearance of new service scenarios, the technical solutions provided in the embodiments of the present disclosure are also applicable to similar technical problems.

A tunnel technology provides a packet encapsulation approach between two tunnel end points. An upper-layer logical network borders on a lower-layer physical network at an IP tunnel end point (IPTEP), and the IP tunnel end point completes address translation between the logical network and the physical network. An IP tunnel end point used as a start point of a tunnel uses a raw packet (a header thereof includes an address of a packet sender and an address of a packet receiver) as a data payload, encapsulates the raw packet in a tunnel packet (an encapsulated packet), and transmits the tunnel packet to a tunnel peer end. The address of the sender and a destination address in the raw packet are referred to as internal addresses, and an address of the tunnel packet is referred to as an external address. A source address and a destination address of the external address are addresses used when end points at two ends of the tunnel set up the tunnel. An end point used as an endpoint of the tunnel decapsulates the tunnel packet to obtain the raw packet, and forwards the raw packet to a destination according to the destination address of the raw packet.

Figure 1:
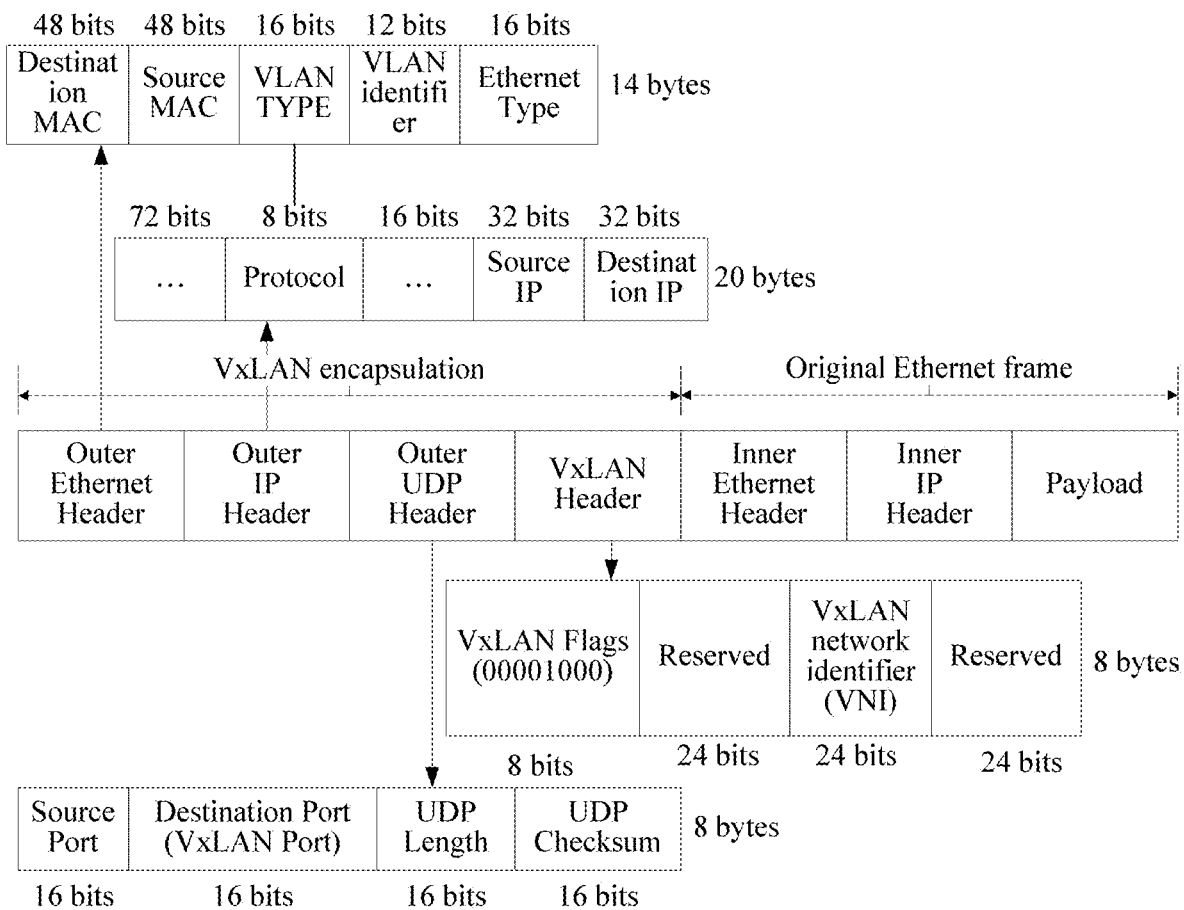
FIG. 1 is a schematic structural diagram of a packet obtained by encapsulating an original Ethernet frame using a VXLAN technology.

FIG. 1 is a schematic structural diagram of a packet obtained by encapsulating an original Ethernet frame using a VXLAN technology. A packet header obtained through VXLAN encapsulation has 50 bytes in total. Therefore, regardless of a length of a raw packet, encapsulating the raw packet by using the VXLAN technology causes encapsulation overheads of 50 bytes, and leads to excessive network bandwidth consumption in a subsequent data packet transmission process. In addition, packet visibility is poor due to packet nesting. Moreover, in some networks, UDP transmission is unavailable, and consequently, the VXLAN technology cannot be used in these networks.

The embodiments of the present disclosure provide a packet transmission implementation method in a software-defined overlay network. A large layer-2 logical network is carried in a conventional physical network. In a packet transmission process, an IP tunnel end point on a packet transmit end expands an IP option of a packet to carry identifiers of a source virtual machine and a destination virtual machine, establishes an address mapping between the logical network and the physical network, and implements network address translation (NAT) and reverse network address translation (RNAT) at a demarcation point (that is, the IP tunnel end point) between the logical network and the physical network. According to the implementation method for carrying the large layer-2 logical network on the conventional physical network that is provided in the embodiments of the present disclosure, the IP option is expanded in the packet to carry network element identifiers of the source virtual machine and the destination virtual machine, so as to avoid nested encapsulation on the packet using a protocol such as the UDP, and eliminate encapsulation overheads caused by use of packet encapsulation in the current system, so that bandwidth consumed by network transmission is reduced, a packet structure is simple, and network visibility is desirable.

It should be noted that the embodiments of the present disclosure provide a packet transmission method to replace an existing packet nested encapsulation technology. In this application, the VXLAN is used as an example for description. However, persons skilled in the art may understand that this application is not merely limited to the VXLAN technology, and this application is also applicable to another packet nested encapsulation scenario.

Figure 2A:
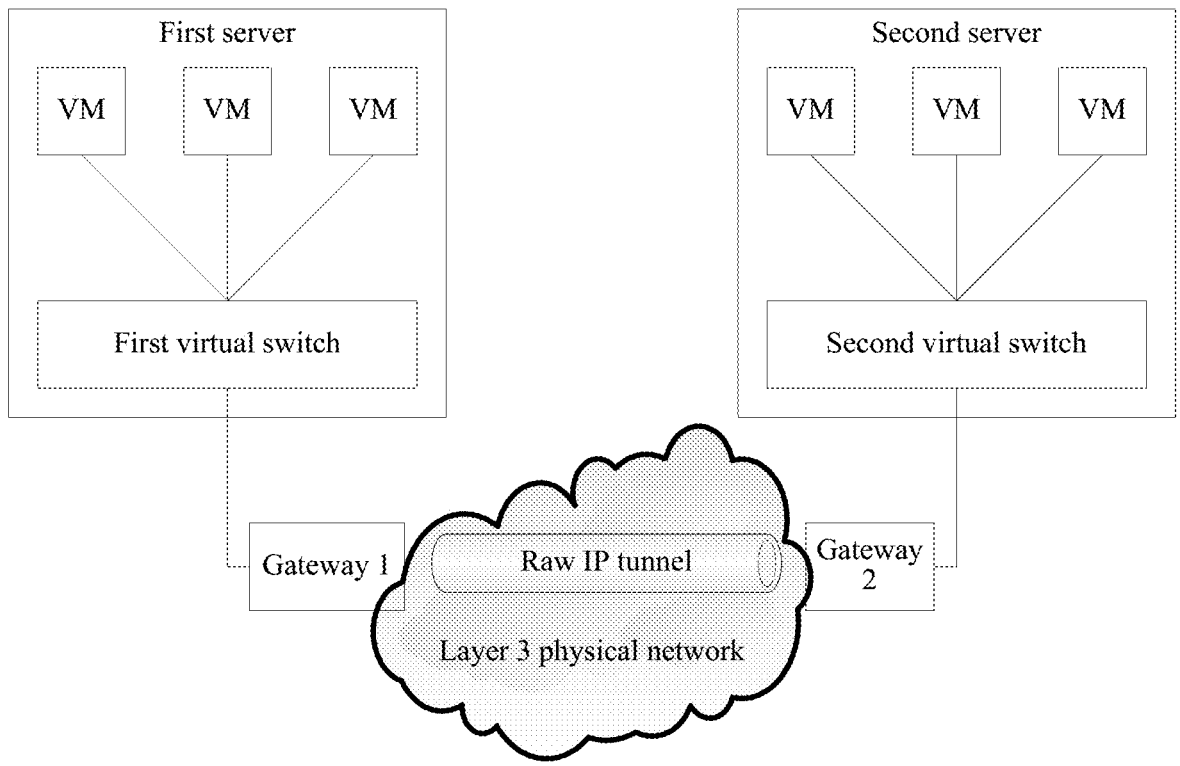
FIG. 2A is a schematic structural diagram of an overlay network according to an embodiment of the present disclosure.

FIG. 2A is a schematic structural diagram of an overlay network according to an embodiment of the present disclosure. This embodiment of the present disclosure is described using two servers as an example. A plurality of virtual machines (VMs) run on each server, virtual machines on a first server and virtual machines on a second server are connected to a network using a first virtual switch vSwitch1 and a second virtual switch vSwitch2 respectively, and a first gateway and a second gateway are edge gateways respectively connecting the first server and the second server to a physical network. The virtual switches of the two servers set up an IP tunnel based on the overlay network to implement interconnection. An IP tunnel end point is the virtual switch or a physical network interface card (the physical network interface card is an intelligent network interface card and can implement packet parsing and modification) on the server. In this embodiment of the present disclosure, the tunnel between the virtual switches is a raw IP tunnel, that is, when a packet is transmitted using the tunnel, only expansion of an IP option is performed, and nested encapsulation is not performed on the packet using a protocol such as the User Data Protocol (UDP).

Figure 2B:
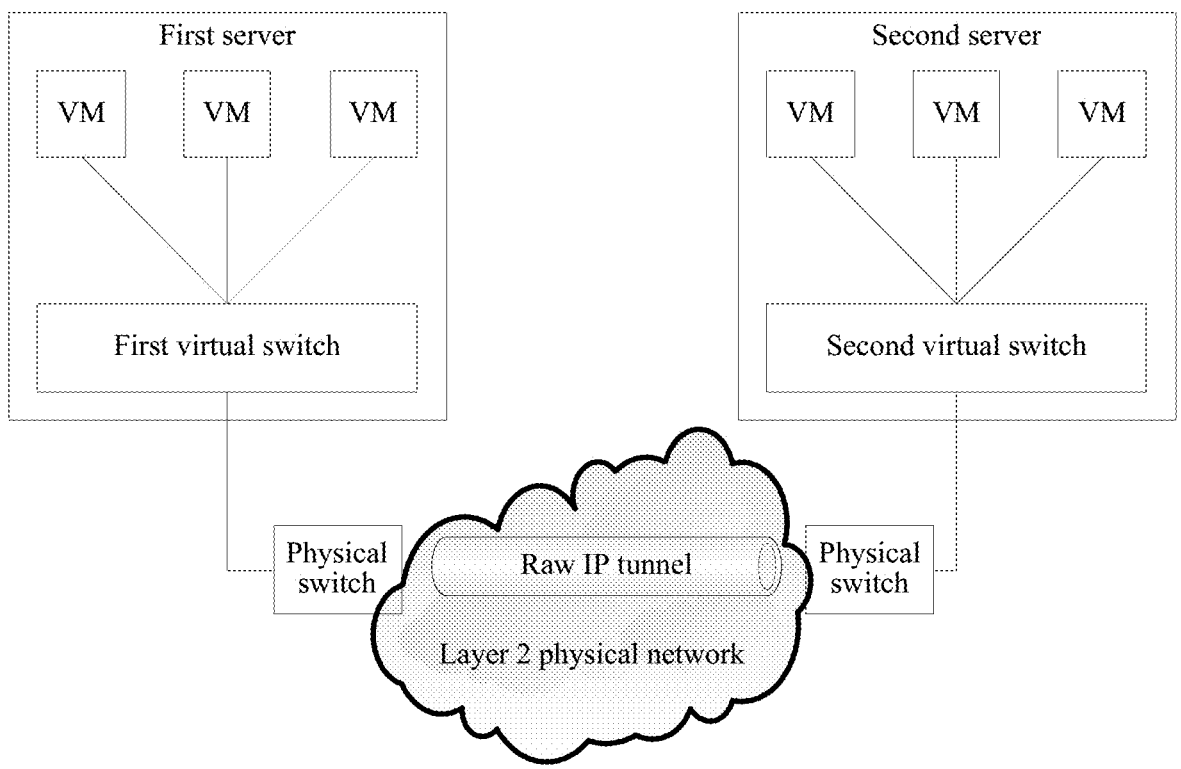
FIG. 2B is a schematic structural diagram of another overlay network according to an embodiment of the present disclosure.

In the overlay network shown in FIG. 2A, the underlying physical network is a layer 3 physical network. FIG. 2B is a schematic structural diagram of another overlay network according to an embodiment of the present disclosure. An underlying physical network is a layer 2 physical network, a server is connected to the layer 2 physical network using a physical switch, and the physical switch is an access switch connecting the server to the layer 2 physical network. This application is applicable to both a layer 2 physical network and a layer 3 physical network. A packet transmission procedure is adaptively modified based on a change in a network structure, and this is not limited in this application.

Figure 2C:
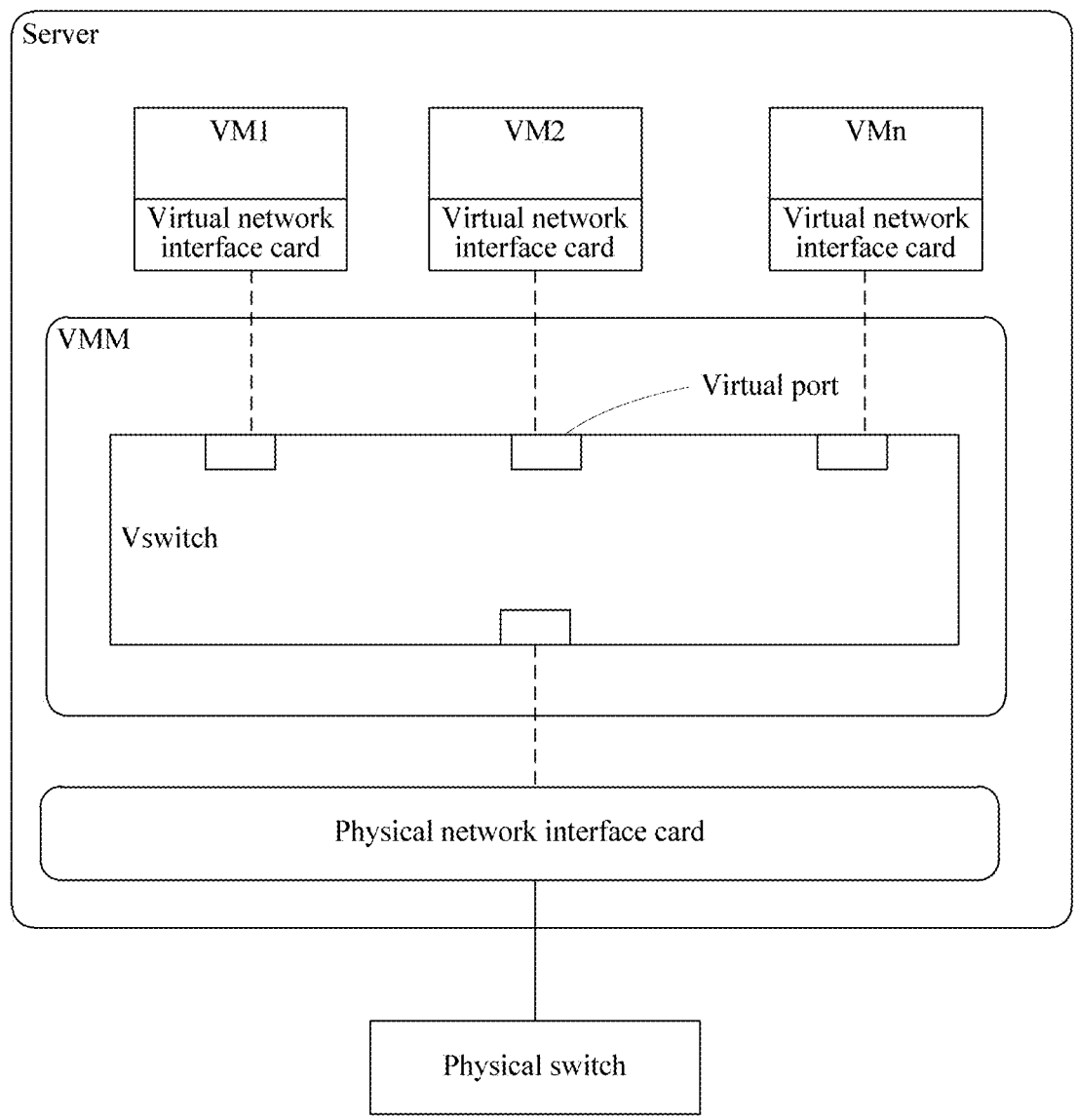
FIG. 2C is a schematic diagram of a virtualized structure on a server according to an embodiment of the present disclosure.

FIG. 2C is a schematic diagram of a virtualized structure on a server according to an embodiment of the present disclosure. A first server and a second server are physical servers, an underlying layer of the physical server is a hardware layer, and the hardware layer mainly includes hardware resources such as a central processing unit (CPU), a memory, a hard disk, and a network interface card. A structure of the physical server is similar to an architecture of a general-purpose computer. However, because a highly reliable service needs to be provided, there are relatively high requirements in terms of a processing capability, stability, reliability, security, scalability, manageability, and the like. Server virtualization implements a virtualized operating environment of a plurality of virtual machines (VM) on a physical server by relying on virtualization software (such as VMWare ESX or Citrix XEN). A software layer that is installed on the server to implement the virtualized environment is referred to as a virtual machine monitor (VMM). A VMM running above the hardware layer is responsible for scheduling, allocating, and managing the hardware resources on the hardware layer. A plurality of virtual machines VMs run above the VMM, and the VMM provides virtualized hardware resources such as a CPU, a memory, a storage, an IO device (such as a network interface card), and an Ethernet switch for each virtual machine, to ensure that the plurality of virtual machines are separated from each other for running. In the virtualized operating environment, the VMM creates a virtual network interface card (vNIC) for each virtual machine, and the virtual switch vSwitch provides a communication capability between virtual machines and between a virtual machine and an external network. For a vSwitch running in the VMM, a virtual network interface card of each virtual machine corresponds to a logical port of the vSwitch, and a physical network interface card of a host corresponds to a port connecting the vSwitch to an external physical switch.

Figure 3:
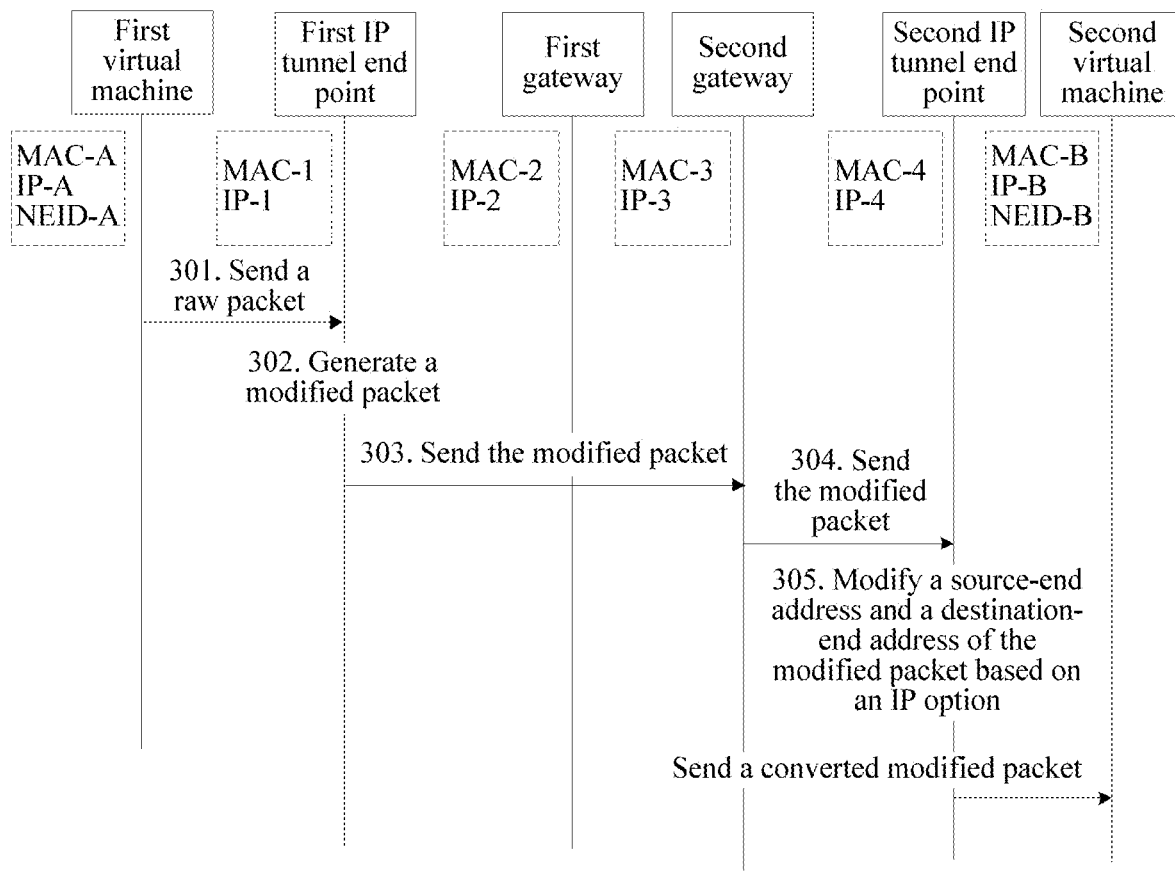
FIG. 3 is a schematic flowchart of a packet transmission method according to an embodiment of the present disclosure.

With reference to the schematic structural diagram of the overlay network shown in FIG. 2A and the schematic diagram of the virtualized structure on the server shown in FIG. 2C, as shown in FIG. 3, an embodiment of the present disclosure provides a schematic flowchart of a packet transmission method. In this embodiment of the present disclosure, an IP tunnel is set up between a first virtual switch and a second virtual switch, a first virtual machine sends a packet to a second virtual machine using the IP tunnel, the IP tunnel is a raw IP tunnel, and an IP option of a packet transmitted using the IP tunnel carries an identifier of the first virtual machine and an identifier of the second virtual machine.

In this embodiment of the present disclosure, for example, a layer 2 address and a layer 3 address of the first virtual machine are respectively MAC-A and IP-A, and a layer 2 address and a layer 3 address of the second virtual machine are respectively MAC-B and IP-B. The first virtual machine and the second virtual machine are located in an upper-layer logical network, and belong to a same network segment in the logical network. A network element identifier of each virtual machine may be a globally valid MAC address or may be a network element identifier that is allocated by a software-defined networking (SDN) controller to the virtual machine and that is valid in a range of an IP tunnel end point. For example, in this embodiment of the present disclosure, network element identifiers of the first virtual machine and the second virtual machine are respectively NEID-A and NEID-B.

In this embodiment of the present disclosure, the lower-layer physical network may be a backbone network over IP. The lower-layer physical network performs routing based on an IP data header of a packet, and performs data forwarding. A first gateway and a second gateway are edge gateways connecting an IP network to the first server and the second server. It should be noted that network communication in a service range of a same IP tunnel end point is interaction in an east-west direction of the logical network, and is implemented by the IP tunnel end point. Network communication across IPTEPs is interaction in a south-north direction of the logical network. An IP tunnel end point at which a source virtual machine is located needs to import a data packet into the physical network, the physical network forwards the data packet to a peer-end IP tunnel end point, and then the peer-end IP tunnel end point completes distribution. In this embodiment of the present disclosure, a layer 2 address and a layer 3 address of a first IP tunnel end point IPTEP-1 in the physical network are respectively MAC-1 and IP-1, and a layer 2 address and a layer 3 address of a second IP tunnel end point IPTEP-2 in the physical network are respectively MAC-4 and IP-4. The first IP tunnel end point and the second IP tunnel end point belong to different network segments in the logical network. The first gateway is a next hop of the first IP tunnel end point in a route in the physical network, and a MAC of a docking port between the first gateway and the first IP tunnel end point is MAC-2, and an IP is IP-2. The second gateway is a next hop of the second IP tunnel end point in a route in the physical network, and a MAC of a docking port between the second gateway and the second IP tunnel end point is MAC-3, and an IP is IP-3.

A schematic flowchart for sending a packet by the first virtual machine to the second virtual machine is provided in an embodiment shown in FIG. 3. A packet transmission procedure in the overlay network that is provided in this embodiment of the present disclosure includes the following steps.

Step 301: The first virtual machine constructs a raw packet, sets a source MAC in an Ethernet data header of the raw packet to the MAC-A of the first virtual machine, sets a destination MAC to the MAC-B of the second virtual machine, sets a source IP in an IP data header of the raw packet to the IP-A of the first virtual machine, and sets a destination IP to the IP-B of the second virtual machine. The first virtual machine sends the raw packet to the first IP tunnel end point to which the first virtual machine belongs for forwarding.

Step 302: The first IP tunnel end point receives the raw packet sent by the first virtual machine, replaces a logical network address in the raw packet with a physical network address, adds network element identifiers of the first virtual machine and the second virtual machine to an IP option of the raw packet to generate a modified packet, and sends the generated modified packet to the first gateway for forwarding. The first IP tunnel end point replaces the source MAC from the MAC-A of the first virtual machine to the MAC-1 of the first IP tunnel end point, replaces the destination MAC from the MAC-B to the MAC-2 of the first gateway, replaces the source IP from the IP-A of the first virtual machine to the IP-1 of the first IP tunnel end point, and replaces the destination IP from the IP-B of the second virtual machine to the IP-2 of the second IP tunnel end point. The first IP tunnel end point adds a network element identifier of a source virtual machine and a network element identifier of a destination virtual machine that are in the raw packet to the IP option of the raw packet. Through the foregoing modification, the first IP tunnel end point modifies the raw packet to the modified packet, thereby converting the packet data from a logical-network transmission form to a physical-network transmission form.

In a possible implementation, the first IP tunnel end point determines the network element identifiers of the source virtual machine and the destination virtual machine based on source-end information and destination-end information that are carried in the raw packet, and adds determined network element identifiers of two communication parties to the IP option in the IP data header. It should be noted that the first IP tunnel end point may obtain a network element identifier and address information of a virtual machine from an SDN controller. In a possible implementation, the address information of the virtual machine may be directly used as the network element identifier of the virtual machine. In the current system, the SDN controller stores information, for example, a port of a network device and a status of the port, a connection topology of a network, and a link status, about a managed device in a management domain of the SDN controller. When a tunnel is set up between two network devices in the management domain, the controller may calculate a forwarding path between the two end point devices based on the stored information. The forwarding path includes a physical outbound interface of the tunnel on the end point device, and a transmission path and transmission manner of the modified packet in an IP network may use a manner in the current system. This is not limited in this embodiment of the present disclosure.

Figure 4:
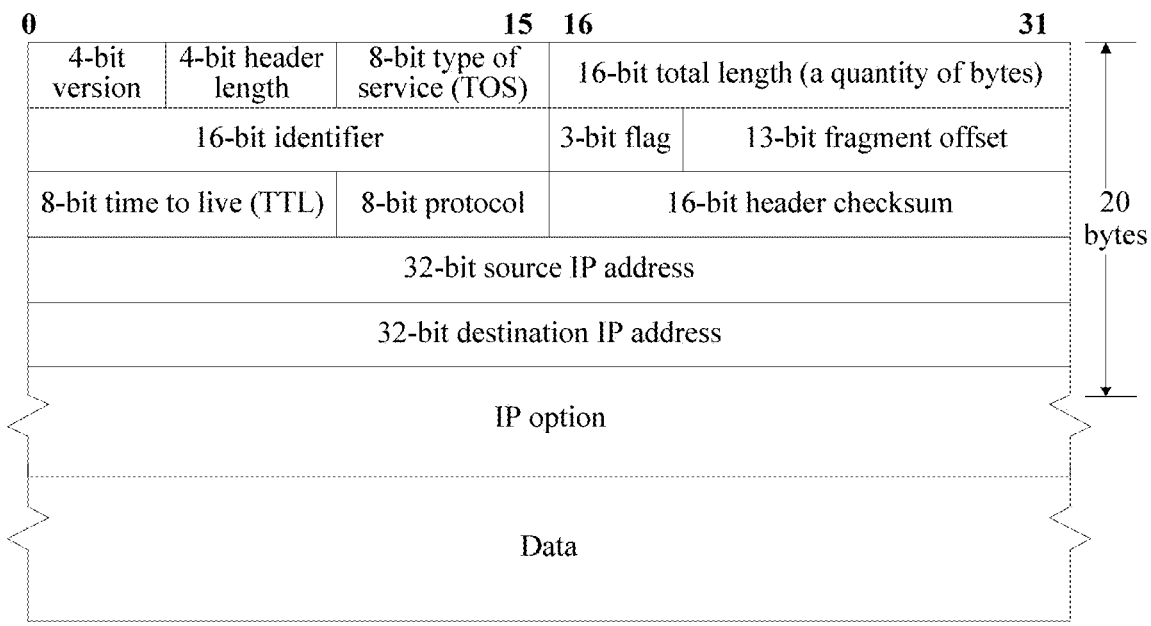
FIG. 4 is a schematic diagram of a format of an IP data header of a packet according to an embodiment of the present disclosure.

In a possible implementation, FIG. 4 is a schematic diagram of a format of an IP data header of a packet according to an embodiment of the present disclosure. The IP data header includes a standard IP header, and preferably, a fixed length is 20 bytes. An IP option is next to the standard IP header. A size of the IP option may be customized, provided that network element identifiers of two communication parties can be carried. Usually, the size of the IP option may be minimally four bytes and maximally not greater than 40 bytes. FIG. 5 is a schematic structural diagram of a newly added IP option according to an embodiment of the present disclosure. The IP option includes two options that are both multi-byte options. One option is used to indicate a source-end network element identifier, and optionally, a value of a code field of the option is "10101". The other option is used to indicate a destination-end network element identifier, and optionally, a value of a code field of the option is "10110".

Step 303: The first gateway receives the modified packet sent by the first IP tunnel end point, performs routing and forwarding based on the destination IP address carried in the IP data header of the modified packet, and sends, over the IP network, the modified packet to the second gateway in which the second IP tunnel end point is located. It should be noted that in a forwarding process in the IP network, each time after the packet is routed by a gateway, the MAC address in the Ethernet data header is re-encapsulated based on MAC address of a current route outbound interface and a next-hop destination-end outbound interface. However, in a transmission process in the IP network, the network element identifiers of the two communication parties that are carried in the IP option in the IP data header remains unchanged.

Step 304: The second gateway sends the modified packet to the second IP tunnel end point. Processing of the modified packet by the second gateway is the same as that of the modified packet by another gateway in the backbone network. The second gateway first performs routing, and then encapsulates the source MAC and the destination MAC based on a current route outbound interface and an outbound interface of the destination-end second IP tunnel end point, respectively modifies the source MAC and the destination MAC that are carried in the modified packet to the MAC-3 of the second gateway and the MAC-4 of the second IP tunnel end point.

Step 305: The second IP tunnel end point replaces physical network addresses in the Ethernet data header and the IP data header of the modified packet with logical network addresses, and sends a converted modified packet to the second virtual machine. The second IP tunnel end point replaces the source MAC carried in the modified packet from the MAC-3 of the second gateway to the MAC-A of the first virtual machine and replaces the source IP from the IP-1 of the first IP tunnel end point to the IP-A of the first virtual machine based on the network element identifier NEID-A of the first virtual machine that is carried in the IP option in the IP data header of the modified packet, and replaces the destination MAC from the MAC-4 to the MAC-B of the destination second virtual machine and replaces the destination IP from the IP-4 to the IP-B of the destination second virtual machine based on the network element identifier NEID-B of the second virtual machine that is carried in the IP option in the IP data header of the modified packet. In this step, the modified packet is converted from the physical-network transmission form to the logical-network transmission form.

Figure 6:
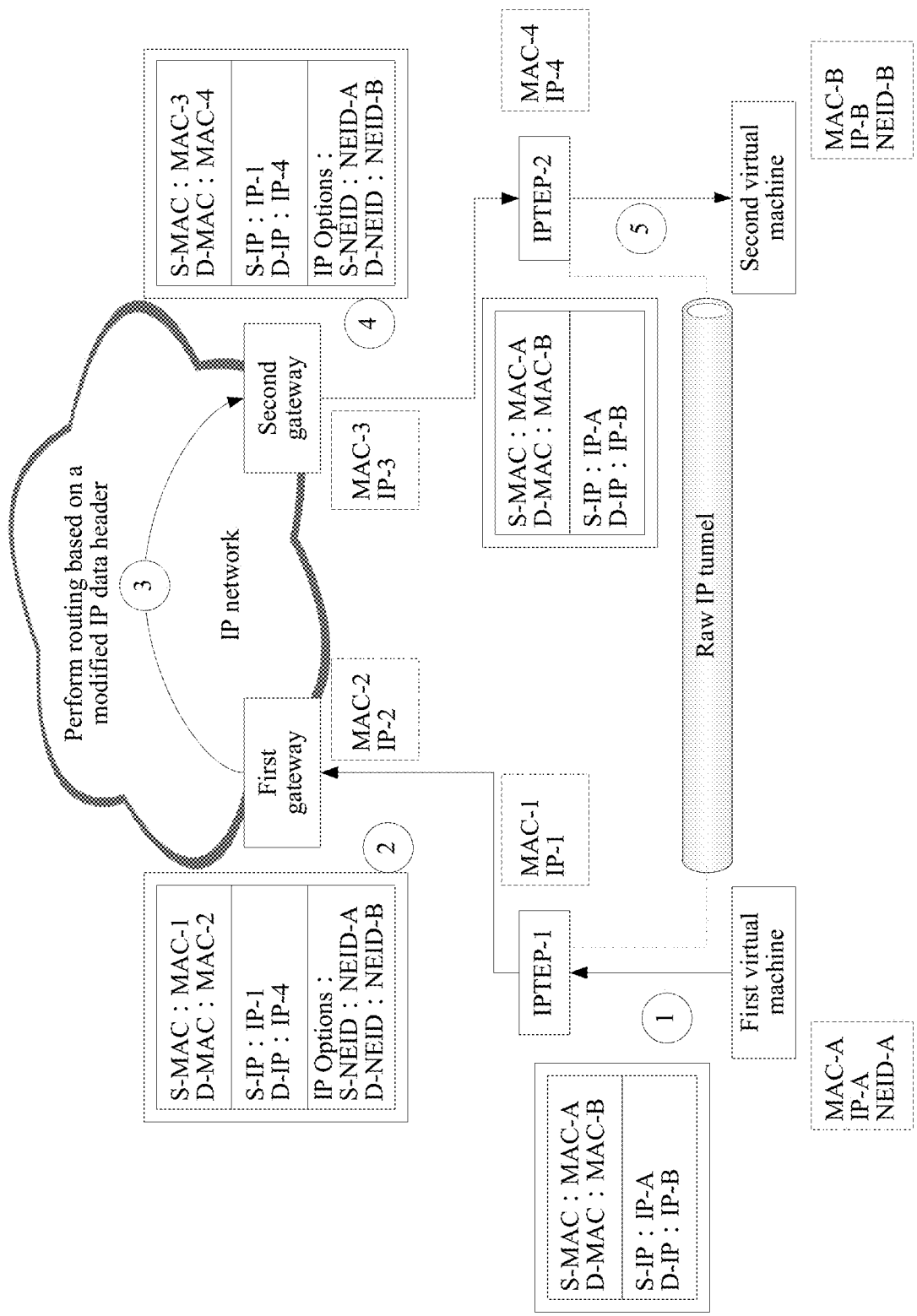
FIG. 6 is a schematic diagram of a change in address information carried in a packet in a packet transmission process according to an embodiment of the present disclosure.

Corresponding to the schematic flowchart in FIG. 3, FIG. 6 is a schematic diagram of a change in address information carried in a packet in a packet transmission process according to an embodiment of the present disclosure. MAC and IP addresses of each entity in the figure are shown in a dashed-line box in the figure. Source-end and destination-end addresses and an IP option that are carried in the packet transmission process are shown in solid-line boxes in the figure.

In this embodiment of the present disclosure, an IP tunnel device on a packet source end does not perform nested encapsulation on a raw packet but modifies an IP option of the raw packet, and adds a network element identifier of a source virtual machine and a network element identifier of a destination virtual machine that are of the raw packet to the IP option. After receiving a modified packet transmitted over an IP network, an IP tunnel end point on a packet destination end modifies source address information and destination address information of the modified packet based on the network element identifier of the source virtual machine and the network element identifier of the destination virtual machine that are carried in the IP option, so as to transfer the packet to the destination virtual machine. In the foregoing process, a source-end identifier and a destination-end identifier are carried in the IP option of the packet, so as to prevent the IP tunnel end point from performing nested encapsulation on the packet, so that bandwidth consumed by network transmission is reduced, a packet structure is simple, network visibility is desirable, and data forwarding performance is high.

In a possible implementation, the first IP tunnel device may be a virtual switch in which a source virtual machine on the first server is located or a physical switch connected to the first server. The second IP tunnel device may be a virtual switch in which a source virtual machine on the second server is located or a physical switch connected to the second server.

Figure 7:
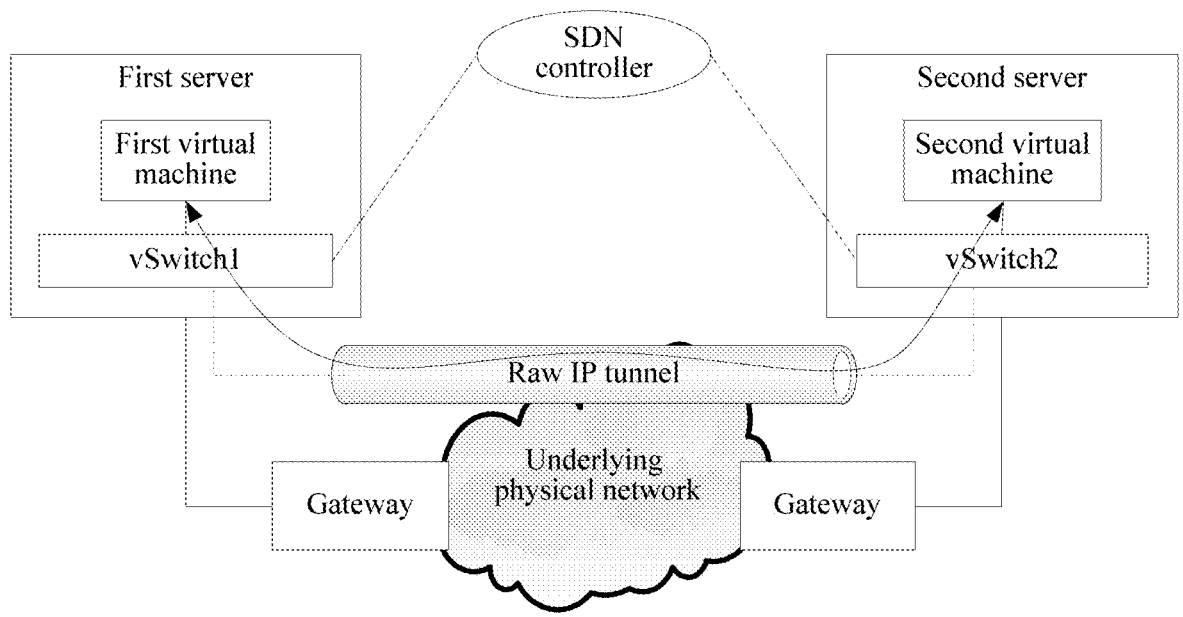
FIG. 7 is a schematic structural diagram of an SDN network according to an embodiment of the present disclosure.

FIG. 7 is a schematic structural diagram of an SDN network according to an embodiment of the present disclosure. This embodiment of the present disclosure is described using two servers as an example. A first server and a second server are respectively connected to a lower-layer physical network using a physical switch 1 and a physical switch 2. Each server is virtualized into a plurality of virtual machines, and virtual machines on the first server and the second server are respectively connected to an upper-layer virtual network by using a first virtual switch vSwitch1 and a second virtual switch vSwitch2 that are locally deployed. The virtual switch generates a virtual port for the VM upwards, and maps the virtual port to a physical port downwards, so as to implement connection between the virtual network and the physical network. The first server and the second server are interconnected by using a packet forwarding network device, and the packet forwarding network device may be a physical switch or a gateway. In this embodiment of the present disclosure, the virtual network is controlled by an SDN controller in a centralized manner. In a possible implementation, the SDN controller may be deployed in a distributed manner. A plurality of controllers form a cluster, presented as a logical controller to the outside.

With reference to the foregoing schematic structural diagram of the SDN network, a VM 1 on the first server communicates with a VM 2 on the second server, and a raw IP tunnel needs to be set up between the VM 1 and the VM 2.

In this embodiment of the present disclosure, the SDN controller collects SDN network topology information and is responsible for allocating and recycling network element identifiers of VMs. The SDN controller ensures validity and uniqueness of the network element identifiers of the VMs in a network managed by a virtual switch. Generally, one server may virtualize approximately tens of virtual machines, and an IP option can carry network element identifiers of the virtual machines by using a data length of only one byte. When a virtual machine is created on a server or a virtual machine is migrated to a server, the SDN controller allocates an unused network element identifier to the virtual machine. When a VM is destructed or removed from a server, the controller recycles a network element identifier of the VM. Each virtual switch sets up a connection to the SDN controller. When a cloud management platform creates a virtual machine, the SDN controller allocates a network element identifier to the created virtual machine. After the virtual machine gets online, the SDN controller establishes a mapping relationship between the virtual machine and a virtual switch in which the virtual machine is located, and delivers a flow table to each virtual switch. Each virtual switch performs packet forwarding processing based on the flow table delivered by the SDN controller. It should be noted that the foregoing function of the SDN controller may be implemented in an existing manner. An implementation procedure of the foregoing function is not limited in this embodiment of the present disclosure.

In a procedure corresponding to FIG. 5, a source virtual switch modifies a raw packet to generate a modified packet. A destination virtual switch performs recovery on the received modified packet, and modifies address information in the modified packet to address information in the raw packet based on the source-end network element identifier and the destination-end network element identifier that are carried in the IP option.

The source virtual switch performs the following processing on the raw packet.

Address information of a source virtual machine is used as a network identifier and is added to the IP option of the raw packet. The source virtual switch records a correspondence between address information and network element identifiers of virtual machines, and adds a network element identifier of the source virtual machine and a network element identifier of a destination virtual machine to the IP option based on the correspondence and the address information of the source virtual machine and address information of the destination virtual machine that are carried in the raw packet. In a possible implementation, the correspondence may be: a correspondence between a MAC address of the source virtual machine and the network element identifier of the source virtual machine and a correspondence between an IP address of the destination virtual machine and the network element identifier of the destination virtual machine.

The address information of the source virtual machine and the address information of destination virtual machine that are of the raw packet are matched, and a source IP and a source MAC of the raw packet are replaced with an IP and a MAC of an interface connecting a source server to a source physical switch (that is, an IP address and a MAC address of the source virtual switch). A destination IP of the raw packet is replaced with an IP of an interface connecting a destination server on which the destination virtual machine is located to a destination physical switch. When a physical network is a layer 3 network, a destination MAC of the raw packet is replaced with a MAC of a gateway connected to the source server (cross-network-segment communication). Alternatively, when a physical network is a layer 2 network, a destination MAC of the raw packet is replaced with a MAC of an interface connecting the destination server on which the destination virtual machine is located to the destination physical switch (same-network-segment communication).

The destination virtual switch performs the following processing on the received modified packet.

Based on the source-end network element identifier and the destination-end network element identifier that are carried in the IP option of the modified packet, a source IP and a source MAC of the modified packet are replaced with an IP and a MAC of the source virtual machine that correspond to the source-end network element identifier and a destination IP and a destination MAC of the packet are replaced with an IP and a MAC of the destination virtual machine that correspond to the destination-end network element identifier, the network element identifier of the source virtual machine and the network element identifier of the destination virtual machine that are carried in the IP option are deleted to generate a converted modified packet, and the converted modified packet is forwarded to an outbound interface connecting the destination virtual switch to the destination virtual machine.

To implement addition to the IP option and modification of the packet address information in the foregoing procedure on the virtual switch, the foregoing function may be implemented by creating a flow table on the virtual switch. An SDN controller delivers flow tables to the source virtual switch and the destination virtual switch. Generation and delivery of a flow table may be implemented according to a procedure defined in the OpenFlow protocol. The SDN controller adds, deletes, and modifies a flow table on an OpenFlow switch using a Flow-Mod message, and details are not described in this embodiment of the present disclosure.

It should be noted that the virtual machines on the two servers may both be used as a sender and a receiver of a packet. Therefore, flow tables such as a mapping table, a NAT table, and an RNAT table need to be created for the virtual switches deployed on the two servers. For example, as shown in the following table, the following table lists flow tables created on the virtual switches and entries of the flow tables. The flow table includes two items of content: match and action, match indicates a matching condition, and action indicates an action performed when the matching condition is satisfied.

| Flow table | First virtual switch vSwitch1 | Second virtual switch vSwitch2 |
|---|---|---|
| Mapping table | Match a MAC of the source virtual machine (VM 1) and an IP of the destination virtual machine (VM 2) that are in a packet sent by the VM 1, and add network element identifiers of the source virtual machine and the destination virtual machine to an IP | Match a MAC of the source virtual machine (VM 2) and an IP of the destination virtual machine (VM 1) that are in a packet returned by the VM 2, add network element identifiers of the VM 2 and the VM 1 to an IP option of the packet, and forward the packet to the NAT table |

| Flow table | First virtual switch vSwitch1 | Second virtual switch vSwitch2 |
|---|---|---|
| | option of the packet, and the vSwitch1 invokes the NAT table to continue to process the packet | |
| NAT table | Match the MAC of the source virtual machine and the IP of the destination virtual machine that are in the packet sent by the VM 1, replace a source IP and a source MAC of the packet with an IP and a MAC of the first server, replace a destination IP with an IP of the second server, replace a destination MAC with a MAC of the gateway of the first server (cross-network-segment communication), and the vSwitch1 forwards the packet to an outbound interface of the first server | Match the MAC of the source virtual machine (VM 2) and the IP of the destination virtual machine (VM 1) that are in the packet returned by the VM 2, replace a source IP and a source MAC of the packet with an IP and a MAC of the second server, replace a destination IP with an IP of the first server, replace a destination MAC with a MAC of the gateway of the second server (cross-network-segment communication), and forward the packet to an outbound interface of the second server |
| RNAT table | Match the network element identifiers of the source virtual machine (VM 2) and the destination virtual machine (VM 1) that are in the IP option of the packet returned by the VM 2, replace the source IP and MAC of the packet with an IP and the MAC of the VM 2, replace the destination IP and MAC with the IP and a MAC of the VM 1, delete the IP option, and forward the packet to an outbound interface of the VM 1 on the vSwitch1 | Match the network element identifiers of the source virtual machine (VM 1) and the destination virtual machine (VM 2) that are in the IP option of the packet returned by the VM 1, replace the source IP and the source MAC of the packet with an IP and the MAC of the VM 1, replace the destination IP and MAC with the IP and a MAC of the VM 2, delete the IP option, and forward the packet to an outbound interface of the VM 2 on the vSwitch2 |

Packet parsing and modification may be implemented on the source-end and destination-end virtual machine switches using the foregoing definitions of the flow tables, so as to complete the packet transmission process provided in this application. In the foregoing packet transmission procedure, an IP tunnel device on a packet source end does not perform nested encapsulation on the raw packet but modifies the IP option of the raw packet, and adds the network element identifier of the source virtual machine and the network element identifier of the destination virtual machine that are of the raw packet to the IP option. After receiving the modified packet transmitted over an IP network, an IP tunnel end point on a packet destination end modifies source address information and destination address information of the modified packet based on the network element identifier of the source virtual machine and the network element identifier of the destination virtual machine that are carried in the IP option, so as to transfer the packet to the destination virtual machine. A solution of performing nested encapsulation on a packet in the current system is replaced with adding a source-end identifier and a destination-end identifier to the IP option of the packet, so that bandwidth consumed by network transmission is reduced, a packet structure is simple, network visibility is desirable, and data forwarding performance is high.

Figure 8:
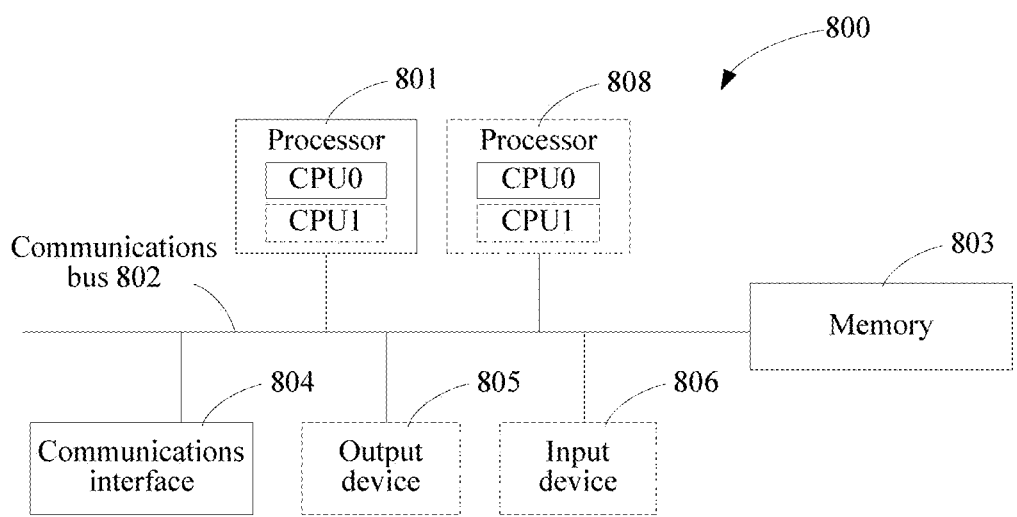
FIG. 8 is a schematic diagram of a computer device according to an embodiment of the present disclosure.

It should be noted that the first IP tunnel end point, the second IP tunnel end point, the gateway, and the SDN controller may be implemented using hardware/software. For example, FIG. 8 is a schematic diagram of a computer device according to an embodiment of the present disclosure. The computer device 800 includes at least one processor 801, a communications bus 802, a memory 803, and at least one communications interface 804.

The processor 801 may be a general-purpose central processing unit (CPU), a microprocessor, an application-specific integrated circuit (ASIC), or one or more integrated circuits configured to control execution of a program of the solution of the present disclosure.

The communications bus 802 may include a path for transmitting information between the components. The communications interface 804 is applicable to any transceiver-type apparatus, and is configured to communicate with another device or a communications network such as the Ethernet, a radio access network (RAN), or a wireless local area network (WLAN).

The memory 803 may be a read-only memory (ROM) or another type of static storage device that can store static information and a static instruction, or a random access memory (RAM) or another type of dynamic storage device that can store information and an instruction, or may be an electrically erasable programmable read-only memory (EEPROM), a compact disc read-only memory (CD-ROM) or another compact disc storage medium, optical disc storage medium (including a compact disc, a laser disc, an optical disc, a digital versatile disc, a Blu-ray disc, or the like) and magnetic disk storage medium, another magnetic storage device, or any other medium that can be configured to carry or store desired program code in the form of an instruction or a data structure and that is accessible to a computer, but is not limited thereto. The memory may independently exist and be connected to the processor by using the bus. Alternatively, the memory may be integrated with the processor.

The memory 803 is configured to store application program code for performing the solution of the present disclosure, and the execution is controlled by the processor 801. The processor 801 is configured to execute the application program code stored in the memory 803.

During implementation, in an embodiment, the processor 801 may include one or more CPUs, for example, a CPU 0 and a CPU 1 in FIG. 8.

During implementation, in an embodiment, the computer device 800 may include a plurality of processors such as the processor 801 and a processor 808 in FIG. 8. Each of these processors may be a single-core (single-CPU) processor, or may be a multi-core (multi-CPU) processor. The processor herein may be one or more devices, circuits, and/or processing cores used to process data (such as a computer program instruction).

During implementation, in an embodiment, the computer device 800 may further include an output device 805 and an input device 806. The output device 805 communicates with the processor 801, and can display information in a plurality of manners. For example, the output device 805 may be a liquid crystal display (LCD), a light emitting diode (LED) display device, a cathode ray tube (CRT) display device, or a projector. The input device 806 communicates with the processor 804 and can accept input by a user in a plurality of manners. For example, the input device 806 may be a mouse, a keyboard, a touchscreen device, or a sensor device.

The computer device 800 may be a general-purpose computer device or a special-purpose computer device. During implementation, the computer device 800 may be a desktop computer, a portable computer, a network server, a palmtop computer (such as Personal Digital Assistant, PDA), a mobile phone, a tablet computer, a wireless terminal device, a communications device, an embedded device, or a device having a structure similar to that in FIG. 8. In this embodiment of the present disclosure, a type of the computer device 800 is not limited.

The first server, the second server, the first IP tunnel end point, the second IP tunnel end point, the gateway, and the SDN controller in the foregoing embodiment may be the devices shown in FIG. 8. The memory stores one or more software modules, configured to implement the functions (for example, the packet parsing and modification functions of the IP tunnel end point) of the foregoing devices. The first server, the second server, the first IP tunnel end point, the second IP tunnel end point, the gateway, and the SDN controller may implement the packet transmission method by using the processor and the program code in the memory.

It should be noted that the computer device shown in FIG. 8 merely provides a possible hardware implementation of parts in a packet transmission system, and a hardware component of the computer device may be added or deleted based on a difference of or change in functions of the parts in the system, so as to match the functions of the parts in the system.

Figure 9:
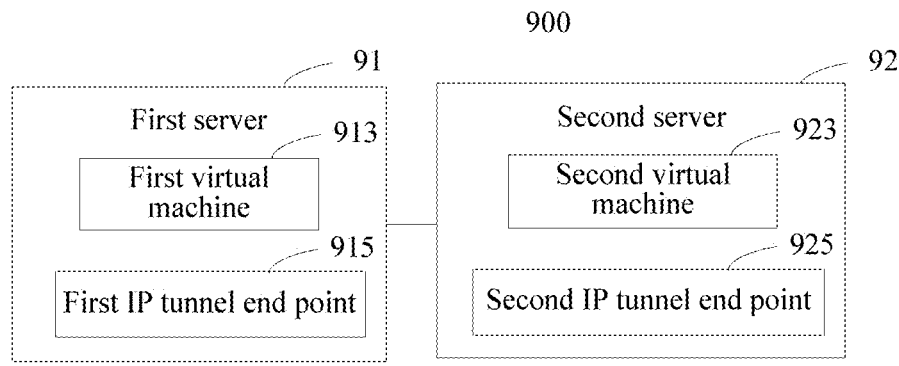
FIG. 9 is a schematic structural diagram of a packet transmission system according to an embodiment of the present disclosure.

Corresponding to the foregoing method embodiment, FIG. 9 shows a packet transmission system 900 according to an embodiment of the present disclosure. The packet transmission system 900 includes at least two servers (91; 92), a first IP tunnel end point 915, and a second IP tunnel end point 925. At least one virtual machine (913; 923) runs on each server (91; 92).

The first IP tunnel end point 915 is configured to: receive a raw packet sent by a first virtual machine 913 to a second virtual machine 923, replace a source IP address of the raw packet with an IP address of the first IP tunnel end point 915, replace a destination IP address of the raw packet with an IP address of the second IP tunnel end point 925 connected to the second virtual machine 923, add a network element identifier of the first virtual machine 913 and a network element identifier of the second virtual machine 923 to an IP option of the raw packet to generate a modified packet, and send the modified packet to the second IP tunnel end point 925 over a network.

The second IP tunnel end point 925 is configured to: receive the modified packet, replace a source IP address with an IP address of the first virtual machine 913 and replace a source MAC address of the modified packet with a MAC address of the first virtual machine 913 based on the network element identifier of the first virtual machine 913 that is carried in the IP option, replace a destination IP address of the modified packet with an IP address of the second virtual machine 923 and replace a destination MAC address of the modified packet with a MAC address of the second virtual machine 923 based on the network element identifier of the second virtual machine 923 that is carried in the IP option, and send the processed modified packet to the second virtual machine 923.

Further, the first IP tunnel end point 915 is deployed on a first server 91 on which the first virtual machine 913 is located, and the second IP tunnel end point 925 is deployed on a second server 92 on which the second virtual machine 923 is located.

Optionally, the first IP tunnel end point 915 and the second IP tunnel end point 925 are virtual switches or physical network interface cards that are deployed on the physical servers (91; 92).

The second IP tunnel end point 925 is further configured to delete the network element identifier of the first virtual machine and the network element identifier of the second virtual machine that are carried in the IP option.

The first IP tunnel end point 915 is configured to: use the MAC address of the first virtual machine 913 as the network element identifier of the first virtual machine 913, and use the MAC address of the second virtual machine 923 as the network element identifier of the second virtual machine 923; or the first IP tunnel end point 915 is configured to determine the network element identifier of the first virtual machine 913 and the network element identifier of the second virtual machine 923 based on a stored correspondence between address information and network element identifiers of virtual machines.

When the first virtual machine 913 and the second virtual machine 923 are in a same network segment, the first IP tunnel end point 915 is further configured to replace a destination MAC address of the raw packet with a MAC address of the second IP tunnel end point 925; or when the first virtual machine 913 and the second virtual machine 923 are in different network segments, the first IP tunnel end point 915 is further configured to replace a destination MAC address of the raw packet with a MAC address of a first gateway connected to the first server 91.

The first IP tunnel end point 915 is further configured to receive a first flow table delivered by an SDN controller, where the first flow table includes a mapping table and a NAT table, the mapping table includes a correspondence between address information of the first virtual machine 913 and the network element identifier of the first virtual machine 913 and a correspondence between address information of the second virtual machine 923 and the network element identifier of the second virtual machine 923, the NAT table indicates a packet forwarding rule, and the packet forwarding rule is: replacing a source IP address and a source MAC address of the first virtual machine 913 that are carried in the raw packet with the IP address and a MAC address of the first IP tunnel end point 915, replacing the destination IP address carried in the raw packet with the IP address of the second IP tunnel end point 925, and when the first virtual machine 913 and the second virtual machine 923 are in different network segments, replacing a destination MAC address carried in the raw packet with a MAC address of a first gateway connected to the first server 91, or when the first virtual machine 913 and the second virtual machine 923 are in a same network segment, replacing a destination MAC address of the raw packet with a MAC address of the second IP tunnel end point 925.

The second IP tunnel end point 925 is further configured to receive a second flow table delivered by the SDN controller, where the second flow table includes an RNAT table that is used to indicate a packet forwarding rule: matching the network element identifiers of the first virtual machine 913 and the second virtual machine 923 that are carried in the IP option of the received modified packet, replacing the source IP address and the source MAC address of the modified packet with an IP address and a MAC address that correspond to the network element identifier of the first virtual machine 913, and replacing the destination IP address and the destination MAC address of the modified packet with an IP address and a MAC address that correspond to the network element identifier of the second virtual machine 923.

Figure 10:
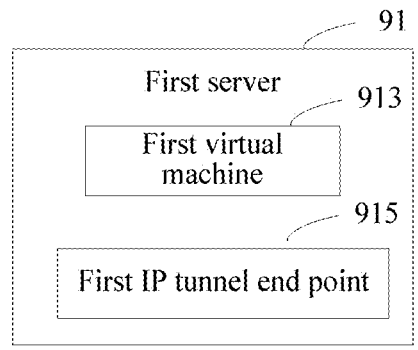
FIG. 10 is a schematic structural diagram of a server according to an embodiment of the present disclosure.

Corresponding to the foregoing method embodiment, FIG. 10 shows a server 91 according to an embodiment of the present disclosure. A first virtual machine 913 and a first IP tunnel end point 915 are deployed on the server 91. The first virtual machine 913 sends, by using the first IP tunnel end point 915 and a second IP tunnel end point 925 on a side of a second virtual machine 923, a packet to the second virtual machine 923.

The first virtual machine 913 is configured to send, to the first IP tunnel end point 915, a raw packet sent to the second virtual machine 923.

The first IP tunnel end point 915 is configured to: replace a source IP address of the raw packet with an IP address of the first IP tunnel end point 915, replace a destination IP address of the raw packet with an IP address of the second IP tunnel end point 925 connected to the second virtual machine 923, add a network element identifier of the first virtual machine 913 and a network element identifier of the second virtual machine 923 to an IP option of the raw packet to generate a modified packet, and send the modified packet to the second IP tunnel end point 925 over a network.

Further, the first IP tunnel end point 915 is further configured to receive a first flow table delivered by an SDN controller, where the first flow table includes a mapping table and a NAT table, the mapping table includes a correspondence between address information of the first virtual machine 913 and the network element identifier of the first virtual machine 913 and a correspondence between address information of the second virtual machine 923 and the network element identifier of the second virtual machine 923, the NAT table indicates a packet forwarding rule, and the packet forwarding rule is: replacing a source IP address and a source MAC address of the first virtual machine 913 that are carried in the raw packet with the IP address and a MAC address of the first IP tunnel end point 915, replacing the destination IP address carried in the raw packet with the IP address of the second IP tunnel end point 925, and when the first virtual machine 913 and the second virtual machine 923 are in different network segments, replacing a destination MAC address carried in the raw packet with a MAC address of a first gateway connected to the first server, or when the first virtual machine 913 and the second virtual machine 923 are in a same network segment, replacing a destination MAC address of the raw packet with a MAC address of the second IP tunnel end point 925.

Figure 11:
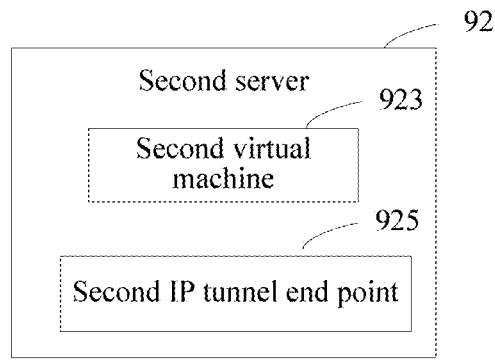
FIG. 11 is a schematic structural diagram of another server according to an embodiment of the present disclosure.

FIG. 11 shows a server 92 according to an embodiment of the present disclosure. A second virtual machine 923 and a second IP tunnel end point 925 are deployed on the server 92. The second virtual machine 923 receives, using the second IP tunnel end point 925, a packet sent by a first IP tunnel end point 915 on a side of a first virtual machine 913.

The second IP tunnel end point 925 is configured to receive a modified packet, where a source IP address of the modified packet is an IP address of the first IP tunnel end point 915, a destination IP address is an IP address of the second IP tunnel end point 925, and an IP option of the modified packet carries a network element identifier of the first virtual machine 913 and a network element identifier of the second virtual machine 923.

The second IP tunnel end point 925 is further configured to: replace the source IP address of the modified packet with an IP address of the first virtual machine 913 and replace a source MAC address with a MAC address of the first virtual machine 913 based on the network element identifier of the first virtual machine 913 that is carried in the IP option, and replace the destination IP address of the modified packet with an IP address of the second virtual machine 923 and replace a destination MAC address of the modified packet with a MAC address of the second virtual machine 923 based on the network element identifier of the second virtual machine 923 that is carried in the IP option.

The second IP tunnel end point 925 is further configured to send the processed modified packet to the second virtual machine 923.

The second virtual machine 923 is configured to receive the processed modified packet.

Further, the second IP tunnel end point 925 is further configured to receive a second flow table delivered by the SDN controller, where the second flow table includes an RNAT table that is used to indicate a packet forwarding rule: matching the network element identifiers of the first virtual machine 913 and the second virtual machine 923 that are carried in the IP option of the received modified packet, replacing the source IP address and the source MAC address of the modified packet with an IP address and a MAC address that correspond to the network element identifier of the first virtual machine 913, and replacing the destination IP address and the destination MAC address of the modified packet with an IP address and a MAC address that correspond to the network element identifier of the second virtual machine 923.

The embodiments of the present disclosure provide a packet transmission method, an apparatus, and a system. A packet sent by the first virtual machine is transferred to the second virtual machine, so that a packet transmission process is completed. In the foregoing packet transmission procedure, the first IP tunnel device on a packet source end does not perform nested encapsulation on the raw packet but modifies the IP option of the raw packet, and adds the network element identifier of the first virtual machine and the network element identifier of the second virtual machine to the IP option. After receiving the modified packet transmitted over an IP network, the second IP tunnel end point on a packet destination end modifies source address information and destination address information based on the network element identifier of the first virtual machine and the network element identifier of the second virtual machine that are carried in the IP option, to transfer the packet to the second virtual machine. A solution of performing nested encapsulation on a packet in the current system is replaced with adding a source-end identifier and a destination-end identifier to the IP option of the packet, so that bandwidth consumed by network transmission is reduced, a packet structure is simple, network visibility is desirable, and data forwarding performance is high. It should be noted that the second IP tunnel end point completely recovers an IP address and a MAC address of a source virtual machine and an IP address and a MAC address of a destination virtual machine, thereby preventing the second virtual machine from discarding the modified packet.

In the embodiments corresponding to FIG. 9, FIG. 10, and FIG. 11, the virtual machine, the first IP tunnel end point, and the second IP tunnel end point each are presented in a form of a functional unit/functional module. The "unit/module" herein may be an application-specific integrated circuit (ASIC), a circuit, a processor and memory for executing one or more software or firmware programs, an integrated logic circuit, and/or another component that can provide the foregoing function. In a simple embodiment, persons skilled in the art may conceive of that the virtual machine, the first IP tunnel end point, and the second IP tunnel end point may use the form shown in FIG. 8. For example, the first IP tunnel end point and the second IP tunnel end point may be implemented by using the processor and the memory in FIG. 8.

An embodiment of the present disclosure further provides a computer storage medium, configured to store a computer software instruction used by the device shown in FIG. 9, FIG. 10, and FIG. 11. The computer software instruction includes a program designed for executing the foregoing method embodiment. A packet transmission method can be implemented by executing the stored program.

Although the present disclosure is described with reference to the embodiments, in a process of implementing the present disclosure that claims protection, persons skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of multiple. A single processor or another unit may implement several functions enumerated in the claims. The fact that certain measures are recited in mutually different dependent claims does not indicate that a combination of these measures cannot bring better effects.

Persons skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code. The computer program is stored/distributed in a proper medium and is provided as or used as a part of the hardware together with another hardware, or may use another allocation form such as by using the Internet or another wired or wireless telecommunications system. The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may alternatively be stored in a computer readable memory that can instruct the computer or any other programmable data processing device to work in a manner, so that the instructions stored in the computer-readable memory generate an artifact that includes an instruction apparatus. The instruction apparatus implements a function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a function in one or more processes in the flowcharts and/or in one or more blocks in the block diagrams.

Although the present disclosure is described with reference to features and the embodiments thereof, obviously, various modifications and combinations may be made to them without departing from the spirit and scope of the present disclosure. Correspondingly, the specification and accompanying drawings are merely examples of description of the present disclosure defined by the accompanying claims, and is considered as any of or all modifications, variations, combinations or equivalents that cover the scope of the present disclosure. Obviously, persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method, comprising:
    receiving, by a first internet protocol (IP) tunnel end point, a raw packet, wherein the raw packet is being sent by a first virtual machine to a second virtual machine;
    replacing, by the first IP tunnel end point, a source IP address of the raw packet with an IP address of the first IP tunnel end point, replacing a destination IP address of the raw packet with an IP address of a second IP tunnel end point connected to the second virtual machine, and adding a network element identifier of the first virtual machine and a network element identifier of the second virtual machine to an IP option in an existing IP data header of the raw packet, to generate a modified packet;
    sending, by the first IP tunnel end point, the modified packet to the second IP tunnel end point over a network;
    receiving, by the second IP tunnel end point, the modified packet;
    replacing, by the second IP tunnel end point, the source IP address of the modified packet with an IP address of the first virtual machine based on the network element identifier of the first virtual machine in the IP option in the IP data header of the modified packet;
    replacing, by the second IP tunnel end point, a source Media Access Control (MAC) address of the modified packet with a MAC address of the first virtual machine based on the network element identifier of the first virtual machine in the IP option in the IP data header of the modified packet;

replacing, by the second IP tunnel end point, the destination IP address of the modified packet with an IP address of the second virtual machine based on the network element identifier of the second virtual machine in the IP option in the IP data header of the modified packet;

replacing a destination MAC address of the modified packet with a MAC address of the second virtual machine based on the network element identifier of the second virtual machine in the IP option in the IP data header of the modified packet; and sending, by the second IP tunnel end point, the modified packet to the second virtual machine.

2. The method according to claim 1, wherein the first IP tunnel end point is deployed on a server on which the first virtual machine is located, and the second IP tunnel end point is deployed on a server on which the second virtual machine is located.

3. The method according to claim 2, wherein the first IP tunnel end point and the second IP tunnel end point are virtual switches or physical network interface cards.

4. The method according to claim 3, wherein before sending, by the second IP tunnel end point, the modified packet to the second virtual machine, the method further comprises:

deleting, by the second IP tunnel end point, the network element identifier of the first virtual machine and the network element identifier of the second virtual machine from the modified packet.

5. The method according to claim 4, wherein the first IP tunnel end point and the second IP tunnel end point each store a correspondence between address information and network element identifiers of a plurality of virtual machines, the address information comprises a respective IP address and a respective MAC address of a corresponding virtual machine of the plurality of virtual machines, and the plurality of virtual machines includes the first virtual machine and the second virtual machine;

wherein before generating the modified packet, the method further comprises:

determining, by the first IP tunnel end point, the network element identifier of the first virtual machine and the network element identifier of the second virtual machine based on the correspondence; and wherein after receiving, by the second IP tunnel end point, the modified packet, the method further comprises:

obtaining, by the second IP tunnel end point based on the correspondence, an IP address and a MAC address that correspond to the network element identifier of the first virtual machine, and an IP address and a MAC address that correspond to the network element identifier of the second virtual machine.

6. The method according to claim 1, wherein when the first IP tunnel end point and the second IP tunnel end point are in a same network segment, the modified packet further identifies a MAC address of the second IP tunnel end point as the destination MAC address of the modified packet.

7. The method according to claim 1, wherein when the first IP tunnel end point and the second IP tunnel end point are in different network segments, the modified packet further identifies a MAC address of a first gateway of the first IP tunnel end point as the destination MAC address of the modified packet.

8. The method according to claim 1, wherein content comprised in the IP option remains unchanged in a transmission process between the first IP tunnel end point and the second IP tunnel end point.

9. The method according to claim 1, wherein before the first virtual machine sends the raw packet, the method further comprises:

receiving, by the first IP tunnel end point, a first flow table delivered by a software-defined networking (SDN) controller, wherein the first flow table comprises a mapping table and a network address translation (NAT) table, the mapping table comprises a correspondence between address information of the first virtual machine and the network element identifier of the first virtual machine, and a correspondence between address information of the second virtual machine and the network element identifier of the second virtual machine, wherein the NAT table indicates a first packet forwarding rule, and the first packet forwarding rule comprises:

replacing a source IP address and a source MAC address of the first virtual machine that are carried in the raw packet with the IP address and a MAC address of the first IP tunnel end point;

replacing the destination IP address carried in the raw packet with the IP address of the second IP tunnel end point; and when the first virtual machine and the second virtual machine are in different network segments, replacing a destination MAC address carried in the raw packet with a MAC address of a first gateway connected to a first server, or when the first virtual machine and the second virtual machine are in a same network segment, replacing a destination MAC address of the raw packet with a MAC address of the second IP tunnel end point; and receiving, by the second IP tunnel end point, a second flow table delivered by the SDN controller, wherein the second flow table comprises a reverse network address translation (RNAT) table that indicates a second packet forwarding rule, and the second packet forwarding rule comprises:

matching the network element identifier of the first virtual machine and the network element identifier of the second virtual machine that are carried in the received modified packet;

replacing the source IP address and the source MAC address of the modified packet with an IP address and a MAC address that correspond to the network element identifier of the first virtual machine; and replacing the destination IP address and the destination MAC address of the modified packet with an IP address and a MAC address that correspond to the network element identifier of the second virtual machine.

10. A system, comprising:

a plurality of servers;

a first internet protocol (IP) tunnel end point;

a second IP tunnel end point; and a plurality of virtual machines, wherein a virtual machine of the plurality of virtual machines runs on each server of the plurality of servers;

wherein the first IP tunnel end point is configured to:

receive a raw packet, the raw packet being sent by a first virtual machine of the plurality of virtual machines to a second virtual machine of the plurality of virtual machines;

replacing, by the first IP tunnel end point, a source IP address of the raw packet with an IP address of the first IP tunnel end point, replacing a destination IP address of the raw packet with an IP address of a second IP tunnel end point connected to the second virtual machine, and adding a network element identifier of the first virtual machine and a network element identifier of the second virtual machine to an IP option in an existing IP data header of the raw packet, to generate a modified packet; and send the modified packet to the second IP tunnel end point over a network; and wherein the second IP tunnel end point is configured to:

receive the modified packet;

replace the source IP address of the modified packet with an IP address of the first virtual machine based on the network element identifier of the first virtual machine in the IP option in the IP data header of the modified packet;

replace a source media access control (MAC) address of the modified packet with a MAC address of the first virtual machine based on the network element identifier of the first virtual machine in the IP option in the IP data header of the modified packet;

replace the destination IP address of the modified packet with an IP address of the second virtual machine based on the network element identifier of the second virtual machine in the IP option in the IP data header of the modified packet;

replace a destination MAC address of the modified packet with a MAC address of the second virtual machine based on the network element identifier of the second virtual machine in the IP option in the IP data header of the modified packet; and send the modified packet to the second virtual machine.

11. The system according to claim 10, wherein the first IP tunnel end point is deployed on a server of the plurality of servers on which the first virtual machine is located, and the second IP tunnel end point is deployed on a server of the plurality of servers on which the second virtual machine is located.

12. The system according to claim 11, wherein the first IP tunnel end point and the second IP tunnel end point are virtual switches or physical network interface cards.

13. The system according to claim 12, wherein the second IP tunnel end point is further configured to delete the network element identifier of the first virtual machine and the network element identifier of the second virtual machine from the modified packet.

14. The system according to claim 13, wherein the first IP tunnel end point and the second IP tunnel end point each store a correspondence between address information and network element identifiers of the plurality of virtual machines, and the address information comprises a respective IP address and a respective MAC address of a corresponding virtual machine of the plurality of virtual machines;

wherein the first IP tunnel end point is further configured to determine the network element identifier of the first virtual machine and the network element identifier of the second virtual machine based on the correspondence; and wherein the second IP tunnel end point is further configured to obtain, based on the correspondence, an IP address and a MAC address that correspond to the network element identifier of the first virtual machine and an IP address and a MAC address that correspond to the network element identifier of the second virtual machine.

15. The system according to claim 10, wherein when the first virtual machine and the second virtual machine are in a same network segment, the modified packet further identifies a MAC address of the second IP tunnel end point as the destination MAC address of the modified packet.

16. The system according to claim 10, wherein when the first virtual machine and the second virtual machine are in different network segments, the modified packet further identifies a MAC address of a first gateway of the first IP tunnel end point as the destination MAC address of the modified packet.

17. The system according to claim 10, wherein the first IP tunnel end point is further configured to receive a first flow table delivered by a software-defined networking (SDN) controller, wherein the first flow table comprises a mapping table and a network address translation (NAT) table, the mapping table comprises a correspondence between address information of the first virtual machine and the network element identifier of the first virtual machine, and a correspondence between address information of the second virtual machine and the network element identifier of the second virtual machine, the NAT table indicates a first packet forwarding rule, and the first packet forwarding rule comprises:

replacing a source IP address and a source MAC address of the first virtual machine that are carried in the raw packet with the IP address and a MAC address of the first IP tunnel end point;

replacing the destination IP address carried in the raw packet with the IP address of the second IP tunnel end point; and when the first virtual machine and the second virtual machine are in different network segments, replacing a destination MAC address carried in the raw packet with a MAC address of a first gateway connected to a first server, or when the first virtual machine and the second virtual machine are in a same network segment, replacing a destination MAC address of the raw packet with a MAC address of the second IP tunnel end point; and wherein the second IP tunnel end point is further configured to receive a second flow table delivered by the SDN controller, wherein the second flow table comprises a reverse network address translation (RNAT) table that indicates a second packet forwarding rule, and the second packet forwarding rule comprises:

matching the network element identifier of the first virtual machine and the network element identifier of the second virtual machine that are carried in the received modified packet;

replacing the source IP address and the source MAC address of the modified packet with an IP address and a MAC address that correspond to the network element identifier of the first virtual machine; and replacing the destination IP address and the destination MAC address of the modified packet with an IP address and a MAC address that correspond to the network element identifier of the second virtual machine.

18. A server, comprising:

a processor; and a non-transitory memory, wherein the non-transitory memory has a plurality of instructions stored thereon, that when executed by the processor, cause the processor to:

run a first virtual machine and a first internet protocol (IP) tunnel end point on the server;

cause the first virtual machine to send a raw packet to the first IP tunnel end point in a process of sending the raw packet from the first virtual machine to a second virtual machine; and run the first IP tunnel end point to:
    receive the raw packet;
    replace a source IP address of the raw packet with an IP address of the first IP tunnel end point, replace a destination IP address of the raw packet with an IP address of a second IP tunnel end point connected to the second virtual machine, and add a network element identifier of the first virtual machine and a network element identifier of the second virtual machine to an IP option in an existing IP data header of the raw packet, to generate a modified packet; and
    send the modified packet to the second IP tunnel end point over a network.

19. The server according to claim 18, wherein the instructions, when executed by the processor, further cause the processor to:

run the first IP tunnel end point to receive a first flow table delivered by a software-defined networking (SDN) controller, wherein the first flow table comprises a mapping table and a network address translation (NAT) table, the mapping table comprises a correspondence between address information of the first virtual machine and the network element identifier of the first virtual machine, and a correspondence between address information of the second virtual machine and the network element identifier of the second virtual machine, the NAT table indicate a packet forwarding rule, and the packet forwarding rule comprises:

replacing a source IP address and a source MAC address of the first virtual machine that are carried in the raw packet with the IP address and a MAC address of the first IP tunnel end point;

replacing the destination IP address carried in the raw packet with the IP address of the second IP tunnel end point; and when the first virtual machine and the second virtual machine are in different network segments, replacing a destination MAC address carried in the raw packet with a MAC address of a first gateway connected to the server, or when the first virtual machine and the second virtual machine are in a same network segment, replacing a destination MAC address of the raw packet with a MAC address of the second IP tunnel end point.

* * * * *